3,533,667
ROLLER JOURNAL BEARING FOR RAIL VEHICLES

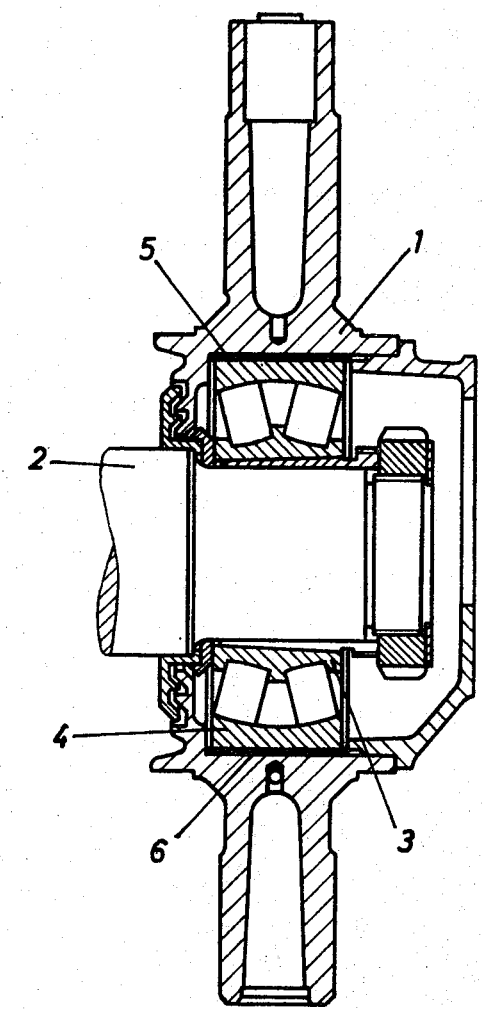

Paul Kalinowski, Bad-Tolz, and Eberhard Volker, Ebenhausen, Germany, assignors to Kugelfischer, Georg Schafer & Co., Schweinfurt, Germany
Filed Sept. 3, 1968, Ser. No. 757,084
Claims priority, application Germany, Sept. 4, 1967, 1,605,082
Int. Cl. F16c 35/06
U.S. Cl. 308—236        6 Claims

ABSTRACT OF THE DISCLOSURE

A bushing or layer of non-corrosive metal or plastic placed between the outer race of the bearing and the interior bore of a journal box of a railway car in order to prevent corrosion or oxidation due to friction caused by axial movement of the outer race. This bushing or layer may be made of a plastic such as polytetrafluorethylene.

---

In roller journal bearings for rail vehicles with roller bearing outer races which are axially displaceable by a limited amount in their journal boxes to assure the possibility of axial adjustment, corrosion or oxidation due to friction is always present as a result of the continuous axial movement. Even in roller journal bearings with bearing outer races secured in the axial direction in the journal box, such corrosion always occurs, since relative movement takes place between the bearing outer races and the box under the influence of the continuously varying load. Removal is made substantially difficult by this corrosion. Furthermore, in the case of roller journal bearings with bearing outer races which are displaceable in the journal box, the corrosion also prevents adjustment movements. The result is then that the bearings operate under an initial stress.

Up to now, it was attempted to avoid this corrosion in these cases by placing a powder having a base of molybdenum disulfide or a corresponding paste between the roller bearing outer race or races and the corresponding journal box. This measure, however, eliminates the effects only for a limited period of time and is therefore not satisfactory.

Such corrosion can also be avoided by keeping oxygen away from the seats. This is possible only with substances which are applied in liquid form and then solidify and thus form an air-impermeable layer. Since the roller bearings are, however, at the same time firmly bonded by said layer to the corresponding journal boxes—which is not permissible for reasons of easy removal and possibly slight axial adjustability of the bearings, it is not a satisfactory solution.

The object of the present invention accordingly is to provide a possibility of preventing the occurrence of corrosion or oxidation due to friction. It should definitely prevent this occurrence for a very long time even in the case of roller bearings with axial displacement of the roller bearing outer races in their journal boxes and thus deformation of the boxes.

In accordance with this invention, this object is achieved by providing between the bearing outer races and the corresponding journal boxes a layer of non-corroding material which prevents direct contact between these parts. The layer can have the shape of a bushing, or it can also be applied in a thickness of about 0.03 to about 0.1 mm. to the outer surface of the outer races and/or to the inner surface of the bore of the journal box. The layer can advantageously consist of a plastic, preferably of a polytetrafluorethylene base, or else consist of a metal, such as copper which does not corrode in contact with steel. As a further feature of the invention, it can also be applied to an intermediate bushing which itself can consist of material which corrodes.

In addition to preventing the production of corrosion or oxidation due to friction, an advantage is obtained with this invention in that the fricion can be reduced by a suitable selection of the material of which the layer is formed. In this way, on the one hand, the adjustment movement of the bearing or bearings in the corresponding box is facilitated, while at the same time easy removal is made possible.

One embodiment of the invention will be described by way of example below with reference to the accompanying drawings, the sole figure of which is a longitudinal section through a journal bearing for rail vehicles developed in accordance with the invention with a double-row self-aligning roller bearing.

In accordance therewith, the one end of the axle 2 is supported in the journal box 1 via a double-row self-aligning roller bearing the inner race 3 of which is firmly keyed onto the axle 2, while the outer race 4 is arranged with axial play in the corresponding bore 5 of the box 1. Between the outer race 4 and the bore 5, a layer 6 of polytetrafluorethylene is provided.

What is claimed is:
1. A roller journal bearing device for rail vehicles comprising a journal box, at least one roller bearing provided within said box and having an inner race ring mounted on one journal end of a rail vehicle axle, an outer race ring surrounded by said box and a plurality of roller elements uniformly arranged between said inner race ring and said outer race ring, and a layer of non-corrosive material disposed between said outer race ring and said box to permanently prevent contact therebetween and avoid generation of corrosion between the outer race ring and the box due to friction.
2. A roller journal bearing according to claim 1, wherein said layer is a bushing.
3. A roller journal bearing according to claim 1, wherein the layer is applied to at least one of either the outer surface of the outer race means or the inner surface of the bore of the journal box and has a thickness of about 0.03 to about 0.1 mm.
4. A roller journal bearing according to claim 2, wherein the layer consists of a plastic preferably having a base of polytetrafluorethylene.
5. A roller journal bearing according to claim 3, wherein the layer consists of a metal which does not corrode upon contact with steel.
6. A roller journal bearing according to claim 1, wherein the layer is applied to an intermediate bushing which may consist of material which corrodes.

References Cited
UNITED STATES PATENTS

| | | | |
|---|---|---|---|
| 1,953,811 | 4/1934 | Lenz | 308—180 |
| 2,969,263 | 1/1961 | Lamson et al. | 308—187 |
| 3,212,832 | 10/1965 | Mayer et al. | |
| 3,294,568 | 12/1966 | Gossmann | 308—241 |

FRED C. MATTERN, Jr., Primary Examiner
F. SUSKO, Assistant Examiner